March 1, 1938. W. HALL 2,109,795
DISPENSER
Filed Aug. 6, 1935 2 Sheets-Sheet 1
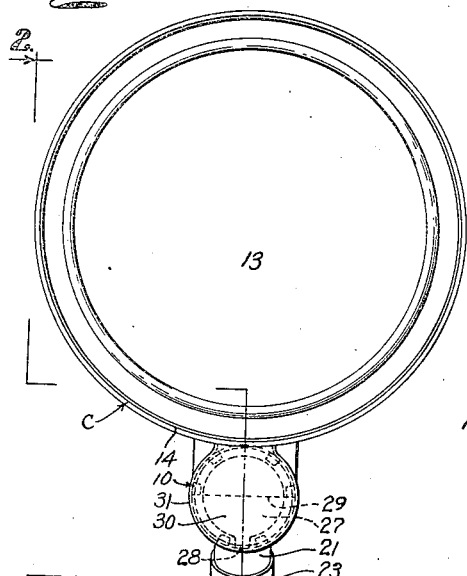
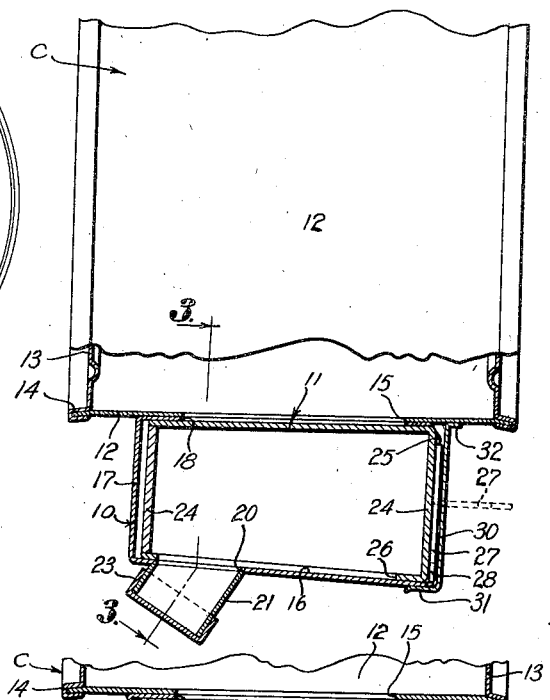
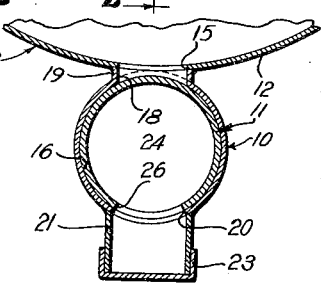
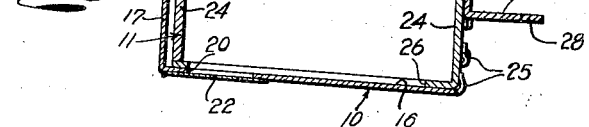
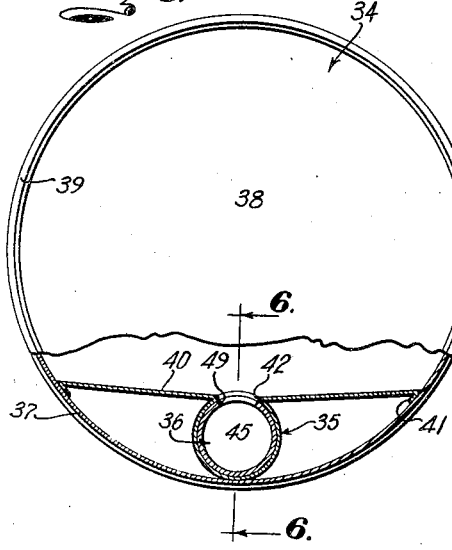
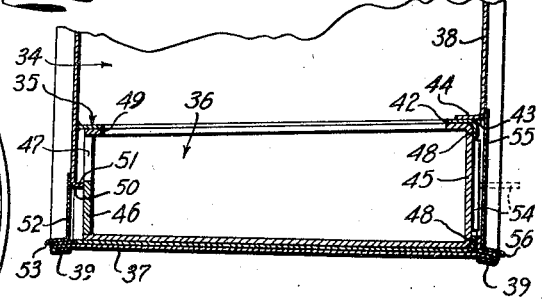
Inventor
WALTER HALL
By
His Attorney March 1, 1938.                W. HALL                2,109,795
                              DISPENSER
                         Filed Aug. 6, 1935              2 Sheets-Sheet 2
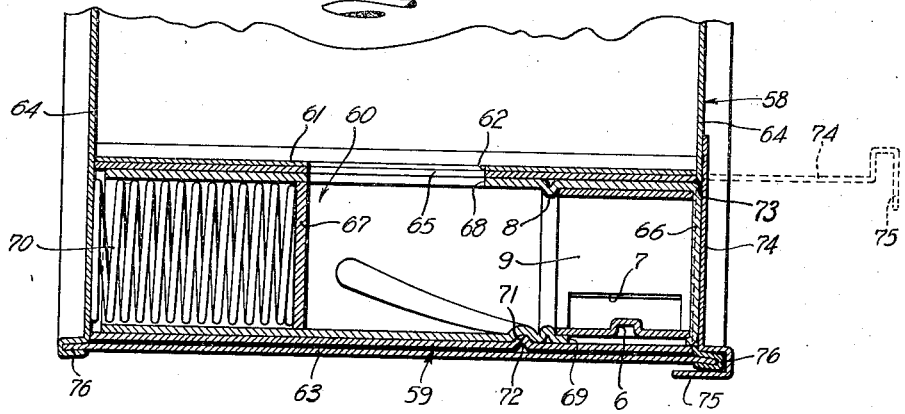
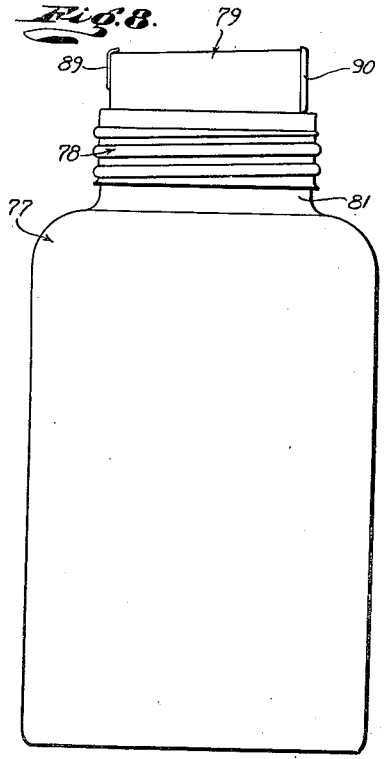
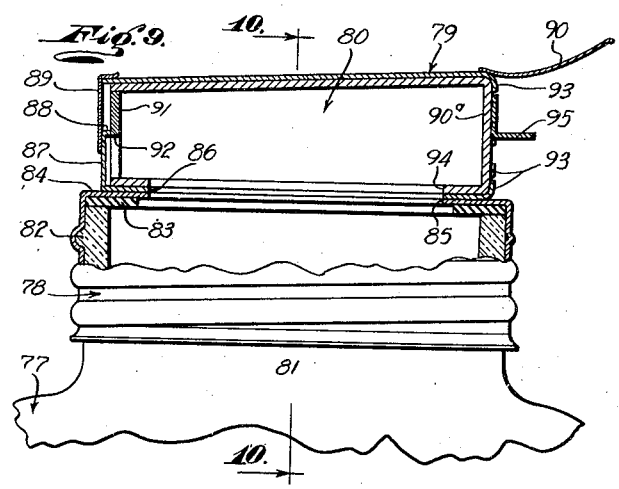
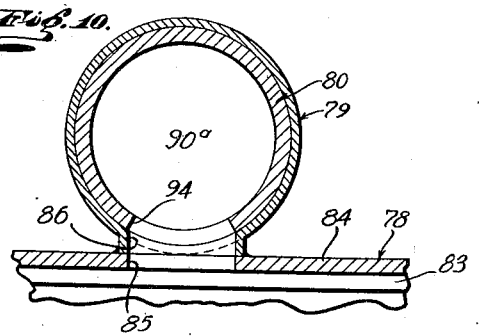
Inventor
WALTER HALL
By
W. H. Caswell
His Attorney Patented Mar. 1, 1938

2,109,795

UNITED STATES PATENT OFFICE 2,109,795

DISPENSER

Walter Hall, Los Angeles, Calif., assignor of one-half to J. Michael O'Meara, Los Angeles, Calif.

Application August 6, 1935, Serial No. 34,899

9 Claims. (Cl. 221—106)

This invention relates to dispensing means and relates more particularly to dispensing means for use on containers for coffee and the like. A general object of this invention is to provide a simple, practical and effective dispenser for application to or embodiment in a container.

Various food products and the like marketed in sealed containers often rapidly deteriorate following the opening of the containers. Ground coffee, for example, is commonly marketed in sealed containers in which it is preserved under a vacuum or partial vacuum. When a container or can of vacuum packed coffee is opened for use there is no way of thereafter excluding the air from the container and the flavor and aroma of the coffee remaining in the can are, to a large degree, lost, due to the evaporation and oxidation of the essential oils of the volatile elements.

Another object of this invention is to provide a dispensing means for application to or embodiment in a container that greatly facilitates the easy and convenient dispensing or removal of desired quantities of the contents from the container and that effectively seals the container against the entrance of air and, therefore, preserves the contents remaining in the container.

Another object of this invention is to provide a dispensing means for application to or embodiment in a container for coffee or the like that may initially form a fully and tightly sealed closure for maintaining the vacuum in the sealed container and that may be easily and quickly operated to discharge a portion of the contents and then returned to its original position while excluding the air from the container to preserve the contents.

Another object of this invention is to provide a dispensing means for application to or embodiment in a container that does not at any time permit the direct communication of the atmosphere with the interior of the container.

Another object of this invention is to provide a dispensing means for application to or embodiment in a container that is operable to discharge measured or predetermined quantities of the contents of the container.

Another object of this invention is to provide a dispensing means of the character mentioned that may be inexpensively provided on or embodied in the container after it is manufactured.

Another object of this invention is to provide a dispensing means for embodiment in a container that is normally and initially within the container or can so that it does not present any projections to interfere with the handling, shipping, or packing of the can.

Another object of this invention is to provide a dispensing means of the character mentioned that is provided on or embodied in a closure for a container, for example, the closure of a Mason jar type of glass container in which ground coffee and the like are sometimes marketed.

A further object of this invention is to provide a dispenser or dispensing means of the character mentioned that may be easily and quickly opened and operated without employing a can opener or like device.

The various objects and features of my invention will be fully understood from the following detailed description of typical preferred forms and applications of the invention, throughout which description reference is made to the accompanying drawings, in which:

Fig. 1 is an end elevation of a container or can illustrating one form of the invention provided thereon. Fig. 2 is an enlarged fragmentary side elevation of the container illustrated in Fig. 1 with a portion of the can and the dispenser in cross section, being a view taken as indicated by line 2—2 on Fig. 1. Fig. 3 is a fragmentary transverse detailed sectional view taken substantially as indicated by line 3—3 on Fig. 2. Fig. 4 is a view similar to Fig. 2 illustrating a slightly modified form of the invention and showing the handle in the operative position. Fig. 5 is an end elevation of a can with a portion broken away to illustrate another form of the invention in transverse cross section. Fig. 6 is an enlarged fragmentary longitudinal sectional view taken substantially as indicated by line 6—6 on Fig. 5. Fig. 7 is a fragmentary detailed sectional view of a container illustrating another form of the invention in longitudinal cross section. Fig. 8 is a side elevation of another container illustrating another form of the invention provided on its closure. Fig. 9 is an enlarged fragmentary elevation view of the upper portion of the container illustrated in Fig. 8 showing the closure and the dispenser of the invention in longitudinal cross section and Fig. 10 is an enlarged transverse detailed sectional view taken as indicated by line 10—10 on Fig. 9.

The form of the present invention illustrated in Figs. 1 to 4, inclusive, of the drawings, includes, generally, a container or can C, a valve housing or body 10 on the can C and a valve 11 in the body 10 comprising a closure for the can C and operable to discharge the contents of the can.

The container or can C may be of any typical construction and may be of any desired shape and size. In the drawings I have shown a typical can C of the class in which ground coffee is commonly marketed. The can C is substantially cylindrical having a cylindrically curved side wall 12 and flat opposite ends 13. The ends 13 are joined with the wall 12 at crimped beads 14 in the usual manner. It is to be noted at this point that the can C does not require the special removable end or cover often provided on coffee cans. In accordance with the invention the can C has a discharge opening 15. In the construction illustrated the opening 15 is provided in the side wall 12, it being understood that it may be provided in one of the end walls 13 if desired. The opening 15 is preferably elongated or in the form of a slot and when provided in the side wall 12 it has its major axis extending axially or longitudinally of the can.

The valve housing or body 10 is provided on the exterior of the can C at a point where it covers or extends over the opening 15. The valve body 10 may be formed of the same material as the container C and is preferably elongate and arranged axially of the can as illustrated in the drawings. In accordance with the invention the body 10 is a socketed or tubular member having a longitudinal opening 16. The main or side wall of the body 10 is concentrically curved about the longitudinal axis of the body and is longitudinally tapered. The smallest end of the valve body 10 is closed by an integral imperforate wall 17. An opening 18 is provided in the upper or inner wall portion of the body 10 to register with the opening 15 in the container. The body 10 just described is rigidly secured to the can C. The end wall 17 is soldered or sweated to the can wall 12 and the portion of the body wall around the opening 18 is sweated to the can wall 12.

In accordance with the invention the body 10 is provided with a discharge. The discharge may be a simple opening 20 in the lower or outer wall of the body 10, as illustrated in Fig. 4, or may comprise a spout 21 as illustrated in Figs. 1, 2, and 3. The discharge, that is the opening 20 or the spout 21, is provided on the body 10 at a point adjacent its small end and substantially diametrically opposite the opening 18. Where the opening 20 is employed it may be initially closed by a seal 22 soldered or sweated to the body 10. The seal 22 may have a tab or outwardly turned part whereby it may be readily peeled or removed from the body 10. Where the discharge comprises the spout 21 a cap 23 is pressed or force-fitted on the outer end portion of the spout to close its outer end. The cap 23 is operable to fully exclude air from the body 10 and the can opening 15 and is thus operable to maintain the vacuum in the can. The cap 23 is readily removable. In practice the spout 21 may be inclined as clearly illustrated in Fig. 2 of the drawings.

The closure or valve 11 is arranged in the valve body 10 to control the discharge from the can C and normally seal the can against the entrance of air. The valve 11 is a hollow member and is round or annular in cross section and longitudinally tapered to fit the tapered body opening 16. The opposite ends of the valve 11 are closed by flat normal end walls or ends 24. The inner end 24 of the valve 11 preferably has clearance with the end wall 17 of the body 10. The invention provides means for holding and urging the valve 11 inwardly to insure a tight effective sealing contact between the valve and the wall of the tapered body opening 16. The outer end of the body 10 has a plurality of spaced tabs 25 turned or bent inwardly to engage or bear against the outer end 24 of the valve to urge the valve inwardly so that its tapered walls tightly bear on the tapered internal surface of the valve body 10. The spring or resiliency of the body wall and the wall of the valve 11 operates to insure a tight sealing engagement between the contacting surfaces of the body 10 and valve 11.

An opening 26 is provided in the wall of the valve 11 and the valve is turnable between a position where the opening 26 registers with the opening 18 and a position where the opening 26 registers with the opening 20 or the spout 21 to discharge the contents it has received from the can 10. It is to be noted that the valve 11 at all times operates to prevent direct communication of the atmosphere with the interior of the can C. When the valve is in a position where its opening 26 communicates with the opening 18 the wall of the valve closes the opening 20 or the spout 21 and when the valve is in a position where its opening 26 communicates with the opening 20 or the spout 21 its wall seals the opening 18. The opening 26 in the wall of the valve may be in the form of a longitudinally extending slot adapted to fully register with the opening 18. The valve 10 being operable or turnable as just described is adapted to receive or be filled with a definite quantity of the contents of the can when in its receiving position and thus is operable to discharge a definite or measured quantity of the contents when shifted to the position where its opening 26 communicates with the opening 20 of the spout 21.

Means is provided to facilitate the operating or turning of the valve 11. A substantially disc-shaped handle 27 is provided on the outer end 24 of the valve 11. A tab 28 projects from the outer or lower edge portion of the handle 27 to facilitate its engagement. The handle 27 initially lies flat against the end wall 24 and its upper portion is attached to the end 24 while its lower portion is free or unattached. The handle 27 may have its upper half sweated or soldered to the end 24 and, if desired, may have a diametric line 29 of scoring at or adjacent its lowermost line of connection with the end 24. When it is desired to turn the valve 11 for the first time the tab 28 is engaged and the lower portion of the handle 27 is bent outwardly to a position such as illustrated in broken lines in Fig. 2 and in full lines in Fig. 4. The line of scoring 29 facilitates the easy bending of the handle 27. When in the projecting position the handle 27 forms a convenient means for turning the valve 11 between its two positions.

The invention may include an air-tight seal 30 normally or initially closing the outer end of the valve body 10. The seal 30 is a substantially disc-shaped part whose peripheral or edge portion 31 is turned or bent to surround the outer edge portion of the valve body 10. A flange 32 may be provided along the upper edge of the seal 30 and may be soldered or sweated to the wall 12 of the can C. The edge portions 31 of the seal 30 are preferably lightly sweated to the valve body 10. The edge portion 31 may have a tab or outwardly turned part for ready engagement so that it may be easily engaged by the user to facilitate the tearing loose of the seal 30 to make the handle 27 accessible.

It is believed that the operation of the form of the invention illustrated in Figs. 1 to 4, inclusive, of the drawings, will be readily apparent from the foregoing detailed description. As originally provided on or embodied in the can C the seal 30 tightly closes the outer end of the valve body 10 against the entrance of air while the seal 22 or the cap 23 closes the discharge of the valve body against the entrance of air. Thus the container C is tightly sealed to exclude air and maintain the vacuum in the can. When it is desired to open the can C or remove the contents from the can the seal 30 is torn loose exposing the handle 27. The tab 28 of the handle may be readily engaged to bend the handle to the position illustrated in Fig. 4 of the drawings. The handle 27 may be shaped and related to the opening 26 so that the user is at all times aware of the rotative position of the opening so that he may more readily bring the opening 26 in registration with the opening 20 or the spout 21.

The valve 11 which may be in the position illustrated throughout the drawings may be easily turned to the position where its opening 26 communicates with the opening 18. When the valve is in this position a definite or measured quantity of the coffee or contents of the container C may fill into the hollow valve 11. It is to be noted that when the valve is in the position where its opening 26 communicates with the opening 18 to receive the contents from the can its wall completely closes the opening 20 or the spout 21. The seal 22 or the cap 23 may then be removed and the valve 11 turned to a position where its opening 26 registers with the opening 20 or the spout 21. With the valve in this position the measured quantity of coffee or material in the hollow valve freely discharges from the discharge 20 or the spout 21. Before the opening 26 of the valve 11 moves into communication with the opening 20 or the spout 21 the side wall of the valve closes the opening 18. Thus the valve 11 at all times effectively excludes air from the interior of the can C. The valve 10 may be easily operated by means of the handle 27 to discharge or dispense measured quantities of the coffee or contents from the can C. The tapered valve 11 being urged into the tapered valve body 10 at all times operates as a closure to prevent the entrance of air to the can C. The dispensing means illustrated in Figs. 1 to 4, inclusive, of the drawings is easy and convenient to use and operate and may be very inexpensively provided on or embodied in the can C as it is manufactured.

The embodiment of this invention illustrated in Figs. 5 and 6 of the drawings includes, generally, a can 34, a ported valve housing 35 in the can 34 and a closure or valve 36 in the body 35.

The container or can 34 may be of any desired shape and size. I have shown a typical cylindrical can 34 having a cylindrically curved side wall 37 and flat normal ends 38 secured to the wall 37 at the usual beads 39. The valve housing or body 35 is entirely within the can 34 or within the cylindrical confines of the can where it does not form a projection to interfere with the packing and shipping of the can. In the form of the invention illustrated the housing or body 35 comprises or forms a part of a partition 40 extending across the interior of the can 34. It is to be understood that the body 35 may be integral with a wall inside of the can. The partition 40 may extend from one end 38 to the other end and is preferably soldered or sweated to the ends. Flanges 41 may be provided along the longitudinal edges of the partition 40 and may be sweated to the side wall 37 of the can. The partition 40 may be substantially parallel to the longitudinal axis of the can and is preferably inclined downwardly from its lines of connection with the can wall 37. The piece of material forming the partition 40 is bent or formed to have an integral substantially tubular part comprising the valve housing or body 35. The piece of material forming the partition 40 extends inwardly from its lines of connection with the can wall 37 and is then curved laterally or outwardly to leave an elongate opening 42 and to form the valve body 35.

The valve body 35 is partially annular or circular in cross section and the opening 42 forms an opening in its wall which registers with the material containing interior of the can 34. The valve body 35 is longitudinally tapered from one end to the other and its small end or inner end is soldered or sweated directly to an end 38 of the can. The end 38 of the can adjacent the large end of the valve body 35 has an opening 43 and an inwardly turned flange 44 is provided on the end 38 around the opening 43 and is soldered or sweated to the exterior of the valve body 35.

The closure or valve 36 is a hollow longitudinally tapered member turnable within the housing or valve body 35. The outer end of the valve 36 is closed by a flat integral wall 45. A wall or end 46 is provided across the interior of the small end portion of the valve 36 to partially close the end of the valve and leave a discharge opening 47. The small end of the tapered valve 36 preferably has clearance with the adjacent can end 38. Means is provided for holding and urging the valve 36 inwardly to seal with the wall of the tapered valve body 35. Tabs 48 are provided on the large end of the valve body 35 and project inwardly to bear on the end 45 of the valve 36. The tabs 48 bearing on the end of the tapered valve urge the valve into the tapered body 35 to cause it to effectively seal with the internal wall of the body. The spring or resiliency of the material comprising the valve body 35 and the valve 36 insures the effective sealing contact between the valve and the internal surface of the valve body 35. A slot or longitudinal opening 49 is provided in the wall of the hollow valve 36. The opening 49 is positioned and proportioned to entirely or fully register with the opening 42 when the valve 36 is in its closed or material receiving position.

The end 38 of the can 34 adjacent the small end of the valve 36 has a discharge opening 50. The opening 50 is preferably located immediately adjacent the bead 39. An inwardly projecting ridge or flange 51 may surround the opening 50 and may be engaged by the end 46 of the valve 36. The openings 50 and 49 are related so that the discharge opening 50 is closed by the end 46 of the valve when the opening 49 is in register with the opening 42. A seal 52 is sweated to the can to close the opening 50. The seal 52 may have a projecting tab 53 whereby it may be readily peeled off or removed. The seal 52 normally or initially closes the opening 50 against the entrance of air.

The valve 36 is shiftable or turnable between a position where its opening 49 communicates with the opening 42 to receive a quantity of coffee or material from the interior of the can 34 and a position where its opening 47 communicates with the discharge opening 50 to discharge the measured quantity of coffee or material. The invention provides an effective handle 54 for facilitating the turning or operating of the valve 36. The handle 54 may be similar to the handle 27 and may initially lie flat against the end 45 of the valve. The handle 54 has a portion sweated or soldered to the valve end 45 and a portion that is free or unattached. The unattached portion of the handle 54 may be bent to a position such as illustrated by the broken lines in Fig. 6 where it may be readily engaged to turn the valve. A seal 55 is sweated to the can 34 to close or seal the opening 43 and normally cover the flat handle 54. The seal 55 may have a tab 56 whereby it may be easily removed or peeled off to render the handle 54 accessible.

The container or can 34 illustrated in Figs. 5 and 6 of the drawings may be sealed up with the parts in the position illustrated. The seal 52 effectively excludes air from the discharge opening 50 while the seal 55 fully prevents the entrance of air to the opening 43. The dispensing means just described is entirely within the typical container or the confines of the container 34 and does not constitute a projection on the container or necessitate any special shaping of the container. Accordingly, the container may be readily handled, packed and shipped in the usual manner. When it is desired to open the container or discharge the coffee or contents the tab 56 may be engaged to tear or peel off the seal 55. The seal 52 may also be removed at this time. Following the removal of the seal 55 the free unattached portion of the handle 54 may be bent outwardly so that it may be engaged to turn the valve 36. If the valve 36 is initially in the position shown in Figs. 5 and 6 it is filled with the coffee or contents of the can and may be turned to the discharging position where its opening 47 registers with the discharge opening 50. When moved to this position the predetermined or measured quantity of coffee in the hollow valve 36 is free to discharge from the opening 50 when the can is tilted or inverted and the valve fully closes the opening 42 against the discharge of coffee and the entrance of air to the interior of the can. After the coffee or material has been emptied from the hollow valve 36 the valve may be turned to the position where the wall 46 closes the opening 50 and the opening 49 registers with the opening 42. In this position the valve 36 is adapted to receive another measured quantity of coffee or material. It is to be noted that the valve 36 at all times seals the container against the entrance of air. Thus the valve constitutes a closure for the container operating to preserve the coffee or contents of the container. The form of the invention illustrated in Figs. 5 and 6 of the drawings may be easily and inexpensively embodied in the can structure.

The form of my invention illustrated in Fig. 7 of the drawings comprises, generally, a can or container 58, a valve housing or body 59 in the can 58, and a turnable and longitudinally shiftable valve 60 in the body 59 whose movements are combined whereby it has a spiral motion.

The can 58 may be similar to or identical with the can 34 or may be of any other suitable shape. In accordance with the invention a partition 61 extends across the interior of the can 58. The partition 61 is similar to the partition 40 and has an elongate opening 62. The partition 61 is soldered or sweated to the internal walls of the can 58 and inclines or slopes to the opening 62.

The valve housing or body 59 is a tubular member arranged under the partition 61 between the partition and the cylindrical wall 63 of the can 58. The opposite ends of the valve body 59 are soldered or sweated to the opposite ends 64 of the can 58. A slot or elongate opening 65 is provided in the wall of the valve body 59 to register with the opening 62. The valve body 59 may be cylindrical and of uniform diameter throughout its length.

The valve or closure 60 is a hollow cylindrical member shiftable longitudinally and turnable in the valve body 59. The outer end of the valve 60 is closed by an integral wall 66. A transverse partition 67 is provided in the hollow valve 60 at a point between its ends. An elongate opening 68 is provided on the wall of the valve 60 and is adapted to register with the opening 65 when the valve is in its fully closed position illustrated in the drawings. When the opening 68 is in register with the openings 65 and 62 the interior of the valve is in communication with the interior of the can 58 and the contents of the can may fill into the valve. A discharge opening 69 is provided in the wall of the valve 60 adjacent the outer end of the valve. The opening 69 is preferably at the opposite side of the valve from the opening 68.

Means is provided for operating or shifting the valve 60 to the discharging position. A spring 70 is arranged in the valve body 59 under compression between the partition 67 and the adjacent end 64 of the can. The spring 70 exerts an outward pressure or force on the shiftable valve 60. The extreme outer end portion of the valve 60 may be received in an opening 73 in the end wall 64 of the can. The opening 73 is shaped and proportioned to pass or receive the shiftable valve 60. Cam means is provided to impart turning movement to the valve 60 as it moves longitudinally. A spiralled slot or groove 71 is provided in the valve 60 and a cam projection 72 on the body 59 cooperates with the groove. When the valve 60 shifts longitudinally the cooperation of the groove 71 and the projection 72 imparts a turning movement to the valve which causes its opening 68 to move into or out of communication with the opening 65. A seal 74 is provided to effectively seal the opening 73 against the entrance of air to the can and to hold the valve 60 in its in or closed position. The seal 74 is soldered or sweated to the end 64 of the can and has a tab 75 bent around the bead 76 of the can. The tab 75 bent about the bead 76 may assist in holding the seal 74 in place against the pressure exerted by the spring pressed valve 60. The tab 75 constitutes a handle by which the seal 74 may be bent to a position where the opening 73 is open to permit the outward movement of the spring pressed valve 60. The inner end of the groove 71 is adapted to cooperate with the projection 72 to stop the outward movement of the valve 69. When the seal 74 is bent to a position such as indicated by the broken lines in Fig. 7 the tab 75 projects to form a stop which may also operate to limit outward movement of the spring pressed valve.

Means may be provided to close the discharge opening 69 of the valve 60 when the valve is in its out or open position. A ring or tube 9 is arranged in the outer end portion of the tubular valve 60. The tube 9 is rotatable or turnable and is held against longitudinal movement or displacement by the end 66 and an annular ridge or bead 8. The inner valve or tube 9 is located so that it is adapted to extend across and close the opening 69. The tube 9 has a port 7 adapted to register with the discharge opening 69. Notches, recesses 6 or other suitable means may be provided in the tube 9 to be engaged by the user to move the tube between the closed position where it closes off the opening 69 and the open position where its port 7 communicates with the opening 69. It is believed that it will be apparent how the tube 9 is operable to effectively close the opening 69 when the valve 60 is held in its open or out position by the spring 70.

When the can 58 illustrated in Fig. 7 of the drawings, is packed and sealed the seal 74 effectively and fully closes the opening 73 against the entrance of air and retains the spring pressed valve 70 in the in position. The can does not have any large projections and may be readily shipped and packed without interference by the dispensing means. When the can is to be opened for the purpose of dispensing the coffee or contents the tab 75 is engaged for the purpose of bending the seal 74 to a position such as indicated by the broken lines. Immediately upon the bending of the seal 74 to this position the spring 70 moves the valve 60 to a position where it projects from the end 64 of the can. During the outward movement of the valve the cooperation of the groove 71 and projection 72 causes the valve to turn or have a spiral motion so that its opening 68 is moved out of communication with the opening 65. The inner end of the groove 71 may cooperate with the projection 72 to limit the outward movement of the valve 60. The tab 75 on the bent seal 74 is also adapted to stop the valve 60 in a position where the opening 69 is uncovered and the opening 65 is closed by the wall of the valve. When in this position the predetermined or measured quantity of coffee in the hollow valve 60 is free to discharge from its discharge opening 69. The openings 65 and 62 are closed against the entrance of air by the valve 60 so that the valve effectively seals the can at all times. When another measured quantity of coffee or material is desired the valve 60 is moved inwardly to the position illustrated in Fig. 7 of the drawings where its opening 68 registers with the opening 65 to permit the discharge of the coffee into the hollow valve. When the valve 60 is filled it is allowed to move outwardly under the action of the spring 70 to the position where its opening 69 is again uncovered to discharge the coffee.

The embodiment of the invention illustrated in Figs. 8, 9, and 10 of the drawings comprises, generally, a container 77, a closure or cap 78 for the container 77, a valve body 79 on the cap 78, and a valve 80 in the body 79.

The container 77 may be a glass jar or bottle of the Mason jar type in which coffee is sometimes marketed. The container 77 may have a reduced neck 81 provided with an external thread 82. The closure or cap 78 is threaded on the neck 81 having an internal thread for cooperating with the thread 82. A washer 83 may be provided in the cap 78 to seal with the upper end surface of the neck 81. The cap 78 is preferably formed of metal and has a flat horizontal upper end or top 84. In accordance with the invention a slot or elongate opening 85 is provided in the top 84 of the cap.

The valve body 79 is a hollow or tubular member sweated or otherwise fixed to the top 84 of the cap 78. The valve body 79 is positioned to cover or extend over the opening 85 and has an opening 86 registering with the opening 85. In the preferred construction the valve body 79 is longitudinally tapered from one end to the other. An end or wall 87 is provided across the small end of the valve body 79. The wall 87 has a discharge opening 88. A seal 89 is soldered or sweated to the wall 87 and the adjacent end portion of the body 79 to seal or fully close the opening 88. The seal 89 is provided with a tab or is formed so that it may be easily removed by the user. A seal 90 is sweated on the large end of the body to close it against the entrance of air. The seal 90 may be readily peeled to a position such as illustrated in Fig. 9.

The valve 80 is an elongate hollow member longitudinally tapered to fit within the valve body 79. The large end of the tapered valve 80 is closed by an integral wall 90$^a$. A wall 91 at the small end of the valve 80 is provided with a discharge opening 92. Means is provided for urging the tapered valve 80 inwardly in the tapered valve body 79 to insure an effective or perfect seal between the valve and the body 79. Tabs 93 on the large end portion of the body 79 are turned or bent inwardly to bear against the end 90 of the valve and urge the valve inwardly so that its external surface tightly seals with the internal wall of the body 79. An opening 94 is provided in the wall of the hollow body 80 and is located and proportioned to register with the opening 86. The valve 80 is rotatable or turnable between a position where the opening 94 registers with the opening 86 and the opening 92 is closed and a position where the opening 92 registers with the opening 88 and the opening 86 is closed. A tab or handle 95 is preferably provided on the large end of the valve 80 to facilitate the turning of the valve. The handle 95 is readily engageable after the seal 90 has been removed or peeled to a position such as shown in Fig. 9.

The dispensing means illustrated in Figs. 8, 9, and 10 of the drawings may be embodied in or provided on the cap 78 employed to seal the container 77 when the coffee or product is originally packed in the container. In other instances where coffee or other material is marketed in a Mason jar type of container having an ordinary cap the invention may be provided on a cap 78 adapted to replace the common cap and thus more effectively preserve the contents or coffee. When it is desired to open the container 77 for the purpose of discharging a portion of its contents the seal 89 is torn free to expose the opening 88. Assuming the valve 80 to be in the position shown in Figs. 9 and 10 the container is inverted causing the coffee to discharge into the hollow valve. The valve 80 is then turned by means of the handle 85 to a position where the opening 86 is closed and the opening 92 is in register with the opening 88. The container may then be tipped or inclined to cause the measured quantity of coffee in the valve 80 to discharge from the opening 88. When in this position the opening 86 is fully closed so that air is excluded from the container. The valve 80 may then be returned to the position where its opening 92 is closed and its opening 94 registers with the opening 86. When in the last named position the valve operates as a closure preventing the entrance of air to the container 77. The dispensing means illustrated in Figs. 8, 9 and 10 of the drawings may be easily and inexpensively provided on a threaded cap for a glass container and is effective in preserving the contents of a container and in facilitating the discharge of measured quantities of material from the container.

Having described only typical preferred forms and applications of my invention, I do not wish to be limited or restricted to the specific details herein set forth, but wish to reserve to myself any variations or modifications that may appear to those skilled in the art or fall within the scope of the following claims:

Having described my invention, I claim:

1. In combination, a generally cylindrical container, and a dispensing means for the container comprising, a hollow elongated body fixed to the container and having its longitudinal axis parallel with the longitudinal axis of the container, there being a port placing the interior of the body in communication with the container, a hollow valve in the body having a lateral port initially communicating with the first mentioned port and a discharge port initially closed by the side wall of the body, and means for imparting a combined axial and rotary motion to the valve to move it to a position where the first and second mentioned ports are out of communication and the discharge port is open and beyond an end of the container.

2. In combination, a container, and a dispensing means comprising, a housing connected with the container and having a port in communication with its interior, a hollow valve movable in the housing, the valve having a port initially in communication with the first mentioned port and having a discharge port initially closed by the housing wall, and means for imparting a combined axial and turning movement to the valve to move the second mentioned port out of communication with the first mentioned port and to move the discharge port into communication with the atmosphere.

3. In combination, a container, and a dispensing means comprising, a housing connected with the container and having a port in communication with its interior, a hollow valve movable in the housing, the valve having a port initially in communication with the first mentioned port and having a discharge port initially closed by the housing wall, and means for imparting a combined axial and turning movement to the valve to move the second mentioned port out of communication with the first mentioned port and to move the discharge port into communication with the atmosphere, said means including a helical groove in the valve, a part on the housing cooperating with the groove, and a spring acting on the valve to move it axially.

4. A container comprising, a container body having an opening in one wall, a valve housing within the container body, said opening being at an end of the housing, the housing having a port communicating with the interior of the container body, a hollow turnable valve in the housing having a port initially communicating with the first mentioned port and having a discharge port initially closed by the housing, and a seal normally closing said opening and removable to permit operation of the valve to a position where the second mentioned port is out of communication with the first mentioned port and the discharge port is open to discharge at the said opening.

5. A container for coffee and the like including a container body having an opening in one of its walls, a partition extending across the interior of the body and having an opening, a valve housing associated with the partition, a hollow valve in the housing having a port initially communicating with the partition opening and having a discharge port initially closed by the housing, and means for imparting combined axial and rotary movement to the valve to project it through the first named opening to carry a quantity of material for discharge from the discharge port.

6. A container comprising, a container body having an opening in one wall, a valve housing within the container body, said opening being at an end of the housing, the housing having a port communicating with the interior of the container body, a hollow valve in the housing initially in communication with the said port and having a discharge port spaced from said port and initially closed by the surrounding housing, and means for imparting a combined axial and turning movement to the valve to move it out of communication with the interior of the container body and to move its discharge port through said opening to the exterior of the container body.

7. A container for coffee and the like including a container body having an opening in one of its walls, a partition extending across the interior of the body and having an opening, a valve housing within the body between the partition and an opposing wall of the body, the housing having an open end registering with the first mentioned opening and a port communicating with the second mentioned opening, a hollow valve in the housing turnable and axially movable to carry material from the port through the open end of the housing and the said first mentioned opening, and means for urging the valve to turn and move axially through the housing.

8. A container for coffee and the like including a container body having an opening in one of its walls, a partition extending across the interior of the body and having an opening, a valve housing within the body between the partition and an opposing wall of the body, a valve movable in the housing to project through the first named opening to discharge the material, means tending to move the valve from a retracted position to a position where it projects through said first mentioned opening, and a seal normally closing the first mentioned opening and removable to make said means operative.

9. In a container, a container body having an opening, a partition in the container having an opening communicating with the interior of the body, a hollow valve in the container between the partition and an adjacent wall of the container and adapted to initially communicate with the second mentioned opening, the valve having a discharge opening, and means for imparting combined rotary and axial movement to the valve to close the second mentioned opening and move the valve through the first mentioned opening to uncover its discharge opening.

WALTER HALL.